May 30, 1939.  G. A. SWARTZ  2,160,319

EGG GRADING AND PACKING MACHINE

Filed March 11, 1936   4 Sheets-Sheet 1

INVENTOR
George A. Swartz
BY
ATTORNEY

May 30, 1939.   G. A. SWARTZ   2,160,319
EGG GRADING AND PACKING MACHINE
Filed March 11, 1936    4 Sheets-Sheet 2

George A. Swartz
INVENTOR

BY J. F. Ebert
ATTORNEY

May 30, 1939.   G. A. SWARTZ   2,160,319
EGG GRADING AND PACKING MACHINE
Filed March 11, 1936   4 Sheets-Sheet 3

George A. Swartz
INVENTOR

BY
ATTORNEY

May 30, 1939.  G. A. SWARTZ  2,160,319
EGG GRADING AND PACKING MACHINE
Filed March 11, 1936  4 Sheets—Sheet 4
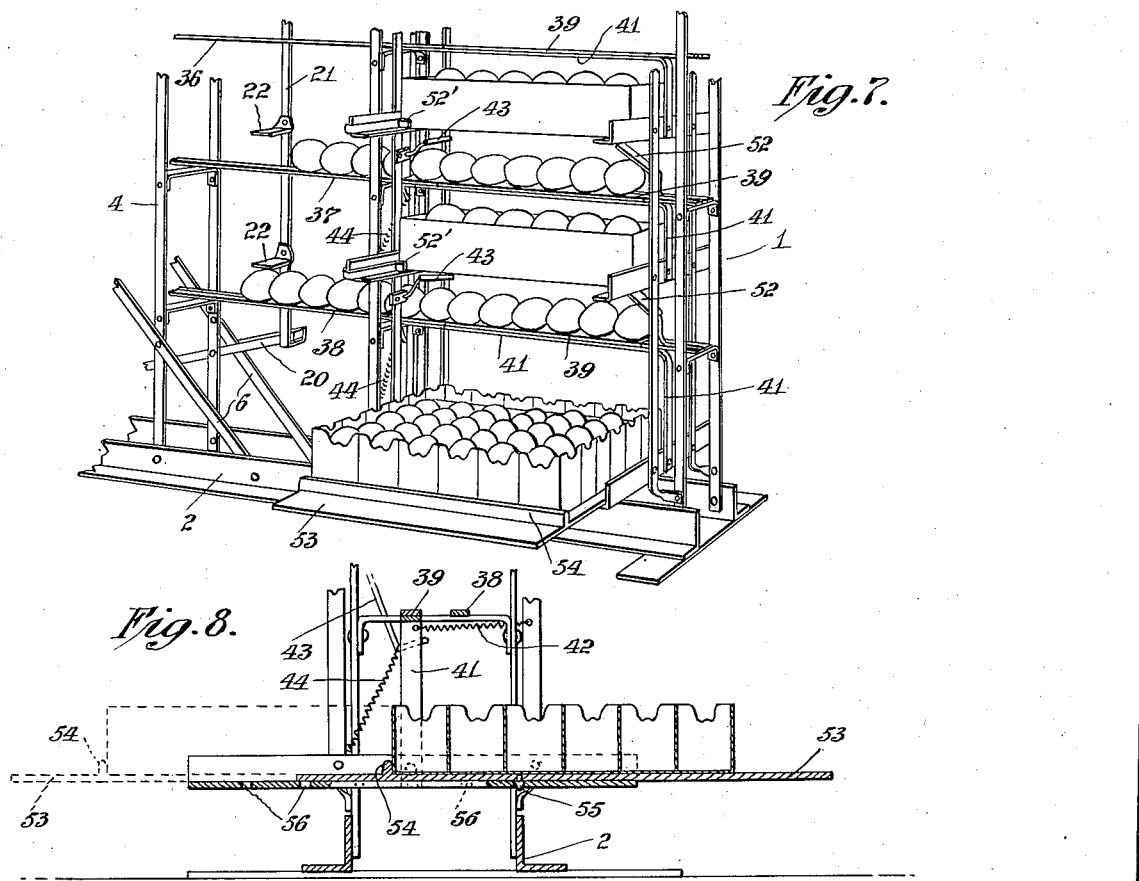
George A. Swartz
INVENTOR
BY J. F. Ebert
ATTORNEY Patented May 30, 1939

2,160,319

UNITED STATES PATENT OFFICE 2,160,319

EGG GRADING AND PACKING MACHINE

George A. Swartz, Hillsdale Manor, N. J.

Application March 11, 1936, Serial No. 68,171

4 Claims. (Cl. 209—121)

This invention relates to an automatic egg grading and packing machine.

The present merchandizing of eggs requires that they be graded as to weight when sold in cartons and practices of the trade have established certain general classes for eggs coming within an accepted or specified standard, as for example "poulet", "medium", etc. grade. A slight variation in the size or weight of eggs falling within a specified class or grade is permitted, but the total weight of a dozen eggs must come within specified weight limits for that grade. It is therefore necessary to sort the eggs according to size or weight.

The machines heretofore in use sorted the eggs as to weight but to my knowledge none of these also provided means for packing the eggs in cartons after being graded. This is an important operation, and if the eggs are taken from the machine by hand to be packed in cartons the grading operation is materially retarded or else additional labor is required to keep the machine running to capacity.

It is an object of the present invention to provide a machine for automatically grading and packing eggs, thereby greatly increasing the efficiency of the machine over one merely capable of grading the eggs.

Another object is to provide a machine of that character which is designed to operate continuously unless the feeding operation is automatically suspended by the filling of a given grade track to capacity with eggs of that grade.

A further object of the invention is to provide an egg grading and packing machine of the utmost simplicity in construction having few moving parts and actuated by light operating forces.

A still further object of the invention is the provision of a machine for grading and packing eggs which requires the services of but a single operator and without necessitating the changing of his position from one side of the machine to another.

Other objects relating to features of construction and detail of design, such as automatic safety control means, alining devices, means for insuring dependable grade and uniform pack, etc., will manifest themselves from a reading of the following specification.

A machine embodying the present invention and operated as contemplated thereby may be generally described as follows. Eggs taken from the gathering baskets are candled by hand, using any type upright candler, and placed with the point of the egg toward the operator on the top or feed track. From this point they are gently and automatically deposited in pockets attached to a vertical conveyor. This conveyor is in continuous movement and carries the eggs down to a series of scales. Each scale is equipped with a movable weight and a graduated plate in ounces and half ounces per dozen for reading the setting of the grade. Any standard grade can be had. "Peewees" are selected by the first scale encountered, "poulets" by the second, "medium" by the third and heavy eggs are deposited on the bottom track. Eggs that are lighter than the selection set on the scale are gently lifted out of the conveyor pocket and accumulate on an inclined track. When this track is filled to capacity the feeding of additional eggs into the conveyer is automatically stopped. All the grade tracks are designed so that a part of each track can be spread apart, by pulling a lever, allowing six eggs to simultaneously pass into a carton or crate filler which is supported directly underneath each respective track. Correct positioning for the carton or crate filler is provided for. Immediately upon releasing the lever the remaining eggs roll down to packing position and automatically start the feeding of eggs into the conveyor. The cartons or crate fillers are then moved to a new position and the operation repeated. The packing of six eggs takes no more time than it takes to pull a lever.

In the accompanying drawings, the machine illustrated embodies the invention in its preferred form as applied to the grading and packing of eggs.

Fig. 7 is a perspective view, showing the eggs placed in a carton and/or filler; and Fig. 8 is a detail sectional view, of a filler and removable platform for supporting the same.

Figure 1:
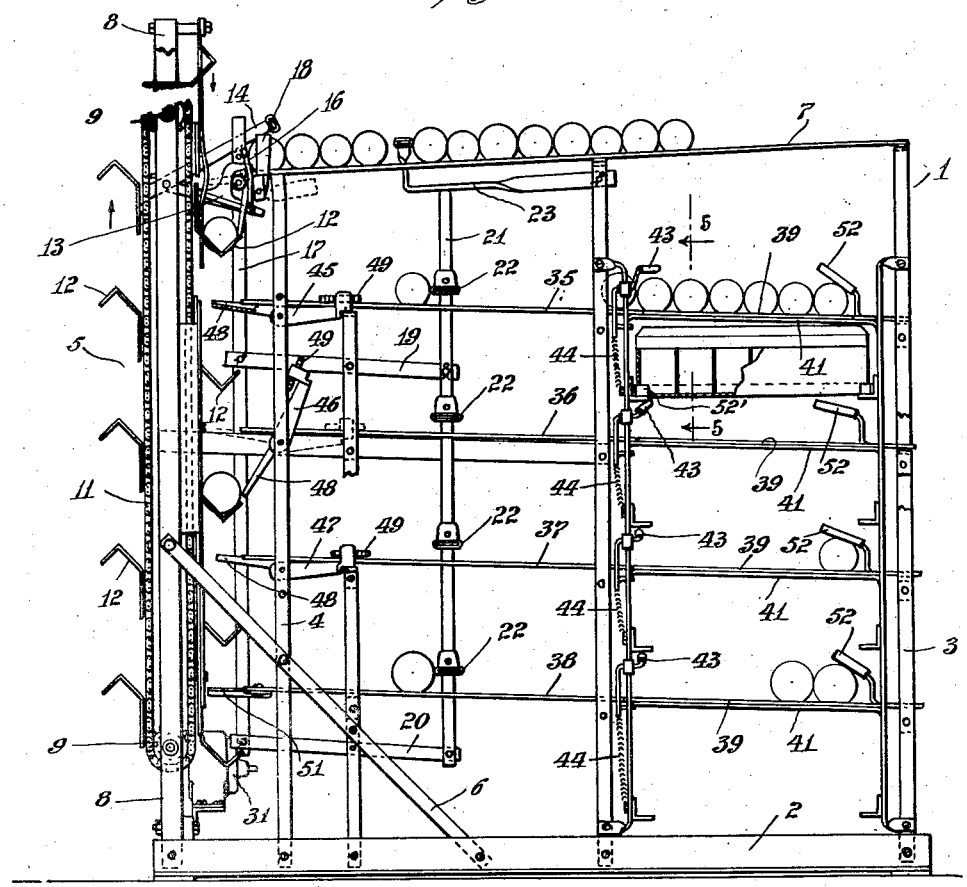
Fig. 1 is a side view, in elevation, of a machine embodying the invention.
Figure 2:
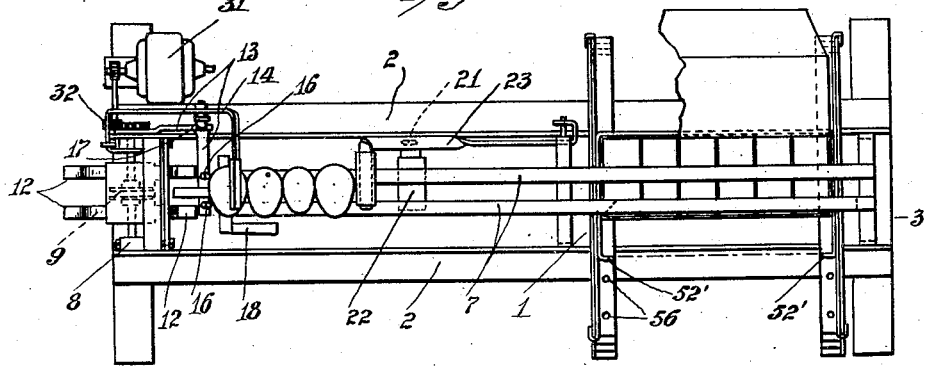
Fig. 2 is a plan view of Fig. 1.
Figure 3:
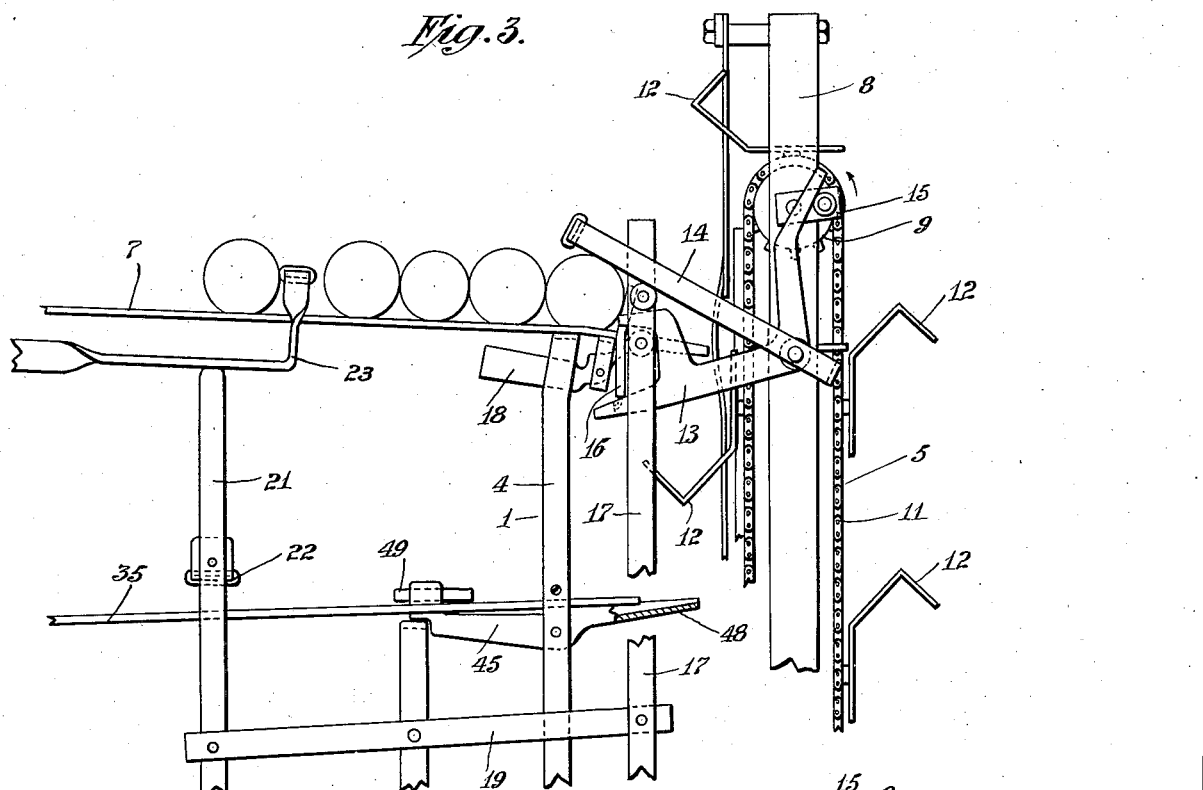
Figs. 3 and 4 are detail side elevational views showing the controlling and feeding mechanism, for depositing the eggs in the conveyor, in different stages of operation.
Figure 4:
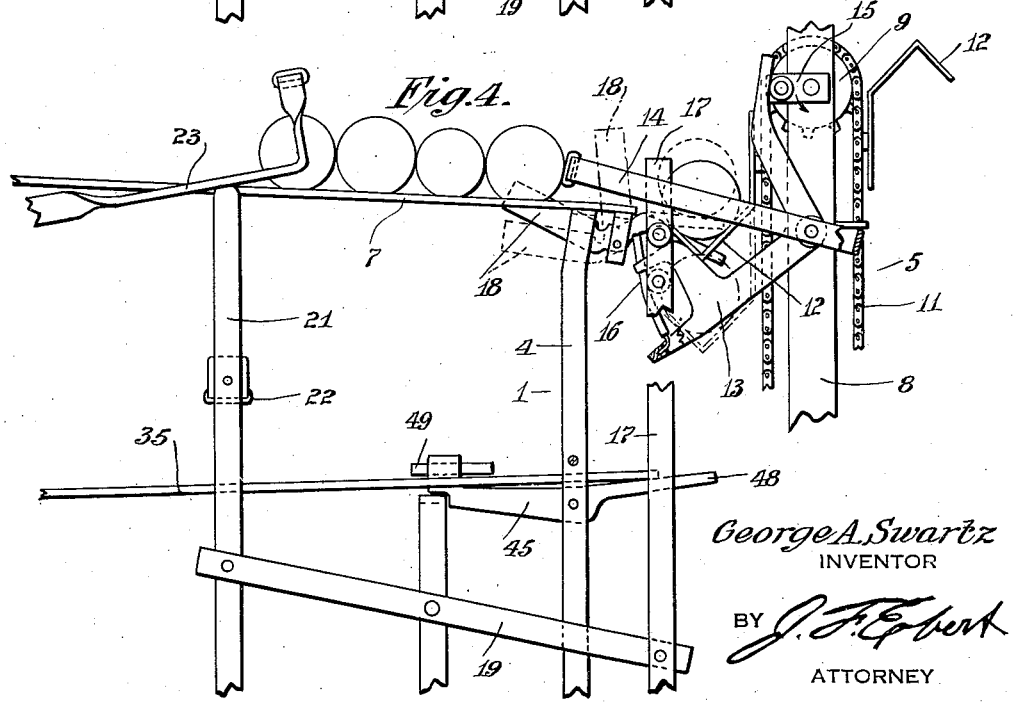
Figure 5:
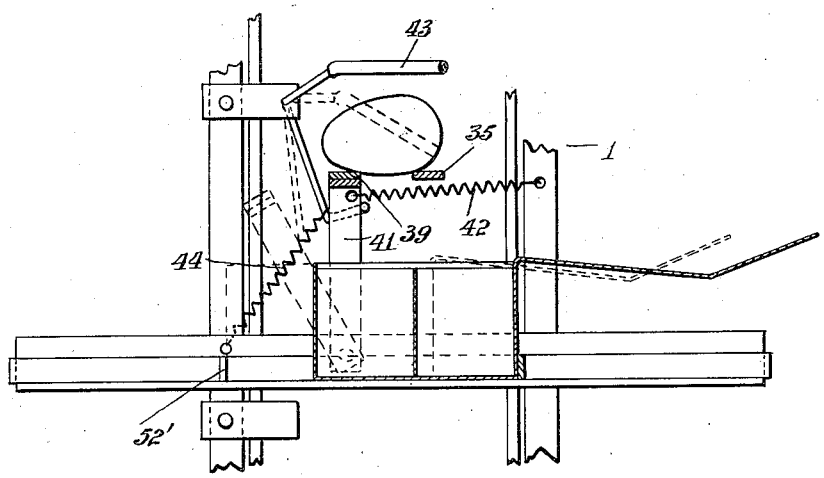
Fig. 5 is a detail view, taken for the line 5—5 of Fig. 1 showing a grade track and egg controlling mechanism.

Referring to the accompanying drawings, particularly Figs. 1 to 5, a frame 1 approximately 16 inches wide, 40 inches long, and about the same in height, is fabricated from strips of steel and suitable angle irons. It is comprised essentially of a base 2, having vertical or upright ends 3 and 4 which are secured in any manner which imparts rigidity to the assembled structure. The fastening members for the top of the end 3 may consist of two flat strips of steel inclined towards the conveyor 5, said strips forming a feed track 7 more fully explained hereinafter. The conveyor designated generally by the reference character 5 is preferably constructed as a separate unit, although secured to the frame 1. To attach the conveyor 5 firmly to the frame 1, braces 6 are provided on opposite sides of the base 2.

The conveyor 5 consists of a frame formed from a pair of vertical rectangular bars 8, held together by suitable cross pieces (not shown). Mounted intermediate the ends of the bars 8 are a pair of sprocket gears 9 carrying a sprocket chain 11 provided at spaced intervals with pocket members 12. These pocket members are each composed of a pair of fingers made of sheet iron bent at a suitable angle to form a nest or support for an egg when deposited therein. The spacing and adjusting of the pockets 12 will be appreciated by those skilled in the art, the only element of importance being the proper timing of the movement of the pockets so that they register with the mechanism for releasing the eggs therein as hereinafter described.

To release the eggs from the feed track one at a time levers 13 and 14 are provided. Lever 13 is given an oscillatory movement by crank 15 which is secured to the same shaft as sprocket gear 9 and so moves in synchronism with pockets 12 on the chain 11. Fingers 16 attached to lever 13 form a step for the eggs. The movement of lever 13 is imparted to the vertical bar 17 which imparts the same movement to lever 14. Lever 14 is lifted by bar 17 but descends by force of gravity until stopped by an egg. It will be seen that when fingers 16 move downward out of engagement with the foremost eggs, lever 14 will follow and the rubber covered free end of lever 14 will pass behind the foremost egg but in front of the second egg arresting it and those behind it. The foremost egg, moving under the force of gravity will deposit into pocket 12. When fingers 16 register, lever 14 is raised, and the eggs being released thereby will roll down to engagement with fingers 16. On its way to the pocket 12 the egg passes over a tilting member 18 which exerts a force on the egg which has the effect of straightening it and centralizing it in the pocket.

Vertical bar 17 is pivotally attached to parallel levers 19 and 20 and has its counterpart in another vertical bar 21 pivotally attached to the opposite end of the same levers. Bar 21 is provided with a number of projections 22 disposed one over each grade track, hereinafter more fully described. Bar 21 being a part of the linkage connected to lever 13 will receive the oscillatory movement of this lever. Projections 22 move up under the force exerted by crank 15 but descends under the force of gravity. It will be seen that the linkage is so connected that the downward movement of bar 21 and projections 22 corresponds with an upward movement of bar 17 and lever 14. When eggs have accumulated on one of the grade tracks to such an extent that an egg stops under one of the projections 22 and arrests it in its downward movement lever 14 will not be lifted thus stopping the feeding of the eggs until the egg is removed from under said projection 22, allowing it to once again make its full stroke.

The movement of bar 21 is imparted to lever 23. The rubber covered end of 23 moves up and down, in and out of engagement with the eggs, and its function is to hold back the bulk of the eggs on the feed track thus preventing an excess of weight against fingers 16.

At the base of the frame 1 there is mounted a universally wound motor 31 which is connected by a suitable reduction gear train 32 to the conveyor 5. This supplies the motive power for operating the machine, and I have found that a motor having a 1/160 horsepower is sufficient for this purpose thus making the machine very economical to operate. Suitable control switches (not shown) are included in the electric circuit for turning the motor on and off.

Referring again to the frame 1, it will be seen that there is provided a series of egg grading tracks which for convenience are designated by the numerals 35, 36, 37, and 38. Each of these tracks are formed of two pieces of strip iron spaced apart a short distance and inclined slightly from the conveyor 5 towards end 3 of the frame 1. The eggs when deposited on any of these tracks will by force of gravity roll towards the right hand side of the machine and accumulate there until subsequently released by a packing mechanism.

Associated with each of the grade tracks and in certain respects forming a part thereof, is a packing mechanism. See particularly Figs. 5 to 8. By referring to Figs. 5 and 6 it will be noted that one of the rails comprising the grade track has a cut out section 39 which is independently supported upon a pivotally mounted U-shaped bracket 41. This bracket is held in an upright or normal position by means of a spring 42 having one of its ends secured to the frame 1 and the other end fastened to one of the arms of the bracket. The forward movement of the bracket 41 is limited by engagement of one of the arms thereof with a bifurcated stop member 43 rotatably mounted in cross-pieces of the frame 1. As will be noted, the lower arm or branch of the stop member 43 is disposed beneath the grade track, and has its end bent to form a projection which normally contacts with the adjacent arm of the bracket 41 by virtue of the tension on spring 42. The upper branch of the stop 43 is normally adjusted to a height so as to provide sufficient clearance for eggs accumulating on a given grade track. When the bracket 41 is pulled back by the hand of the operator as hereinafter explained, the tension on spring 44, one end of which is connected to the frame 1 and the other to the lower arm of the stop 43, causes said stop to rotate in its bearing and thereby bring its upper arm into contact with the adjacent egg (see Fig. 5) on the grade track, thereby arresting the movement of said row of eggs until the release of the bracket 41.

Pivotally supported at the opposite end of each of the grade tracks are weighing devices, 45, 46, and 47. Each of these devices is comprised of a projecting platform 48 which is juxtapositioned with respect to the two finger members forming the egg pockets 12. On the opposite end of each of said devices there is provided a movable weight 49 having associated therewith a graduated plate in ounces and half-ounces per dozen eggs. By adjusting this weight, eggs coming within a fixed range as to size may be gently lifted out of the conveyor pocket by contacting with the platform 48, which in turn effects the transfer of the eggs to its associated grade track. When an egg is heavier than the scale adjustment of a given weighing device, the egg contacting with the platform 48 tips or rotates said device until the egg is clear thereof, and having cleared that particular device, continues upon its travel until it reaches one of said devices adjusted to a selection which includes the weight of that particular egg. If the egg happens to be one coming within the so called "heavy" class or grade it eventually comes to rest upon the grade track 38. This track is not provided with one of the weighing devices as it is intended that all eggs sufficiently heavy to pass the previous scales will accumulate on the lowermost grade track. This is effected by fastening a stop 51 to the free end of the track 38. To limit the extreme travel of the eggs down the grade tracks, they are severally provided with stops 52. To insure gentle handling of the eggs, these and similar stops have been rubber covered.

Figure 6:
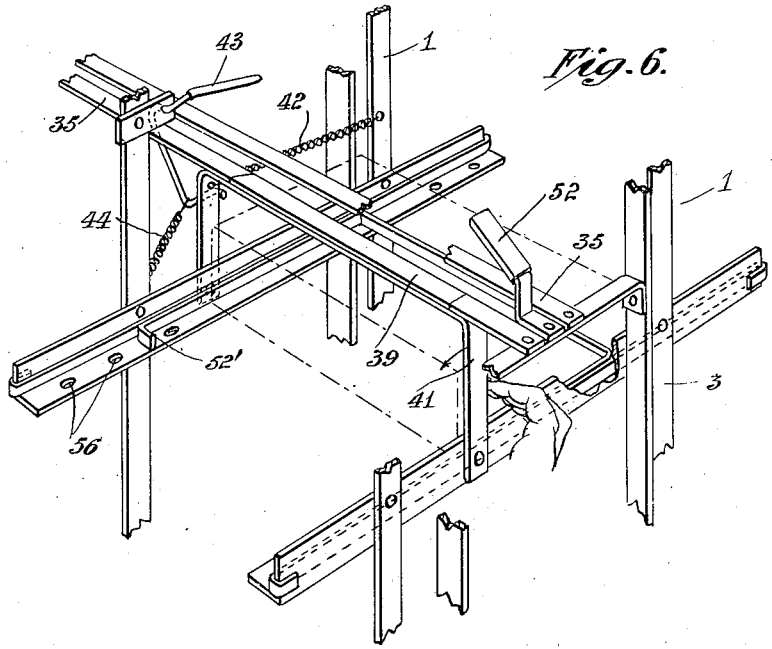
Fig. 6 is a perspective view, of that portion of the frame and grade track comprising the mechanism for dumping the eggs into a carton or filler.

The automatic packing feature of the machine may be described thusly. Referring to Figs. 6 to 8 it will be seen that the cross-pieces forming the right half or section of the frame 1 are composed of angle iron members so positioned that their angles are oppositely disposed. The spacing and length of these members is equal to the width and length respectively of an egg carton or filler. To position properly the carton or filler beneath a given grading track various adjustable expedients or means are used. In the case of a carton this means may comprise a two position abutting member 52' removably mounted upon the cross-pieces. If a crate filler is used it may be supported upon a special base 53, provided with transverse flange 54 against which the crate filler is positioned. The bottom of the base 53 is provided with studs 55 which are adapted to register with a series of apertures 56 formed in the cross angle irons, the spacing of said apertures corresponding to the width of the partitions or separators forming the filler. As each set of six eggs are dumped into the filler, the base 53 is manually moved back another aperture until the filler is loaded. The filler may then be removed to a specially designed rack which is the subject matter of a co-pending application filed by me concurrently herewith.

The operation of the machine is as follows. Through a standard plug the motor 31 may be connected to the ordinary house lighting circuit, and when the current is turned on by means of a switch the conveyor 5 through the gear train 32 is caused to rotate in a clockwise direction. The eggs having preferably been previously candled by hand, are placed upon the feed track 34, with the points of the eggs toward the operator who is then standing facing the side of the machine shown in Fig. 1. Having the points of the eggs toward the operator insures that they will be packed in the cartons or crate filler with the points down which is in accordance with the best practices of the trade.

As one of the pockets 12 come opposite the feed track 7, the releasing mechanism described above is actuated and an egg is deposited into the pocket 12. Let it be assumed that the scales for the grade tracks 35, 36, and 37 have been adjusted for assorting the eggs in the "peewee", "poulet" and "medium" grades, while the track 38 is intended to receive the heavy eggs. For the sake of convenience it may further be assumed that the first several eggs are not sufficiently large to operate the weighing device 45. As these eggs engage the platform 48 they will be gently lifted out of the pocket 12 and by force of gravity roll down the track 35 until the foremost one engages the stop 52, after which they will start accumulating on the track 35. As shown in Fig. 1 an empty carton is placed immediately under the track 35 and in alinement with the bracket 41. When six or more eggs have accumulated on the track 35 the operator (see Fig. 6) reaches for the bracket 41 and with his hand pulls the same towards himself i. e. in a counter-clockwise direction. At the initial movement of the bracket 41 the cut out section 39 of the track 35, separating from the adjacent fixed rail of said track, causes the eggs to begin to fall through the opening, thus created and as their fall continues the eggs assume an up ended position, i. e. they fall in the direction of their longitudinal axis vertical with respect to the carton. Simultaneously with the backward movement of the bracket 41, the stop member 43, under the tension of the spring 44, is rotated so that the upper arm of said member 43 is moved into the path of the adjacent egg, thereby arresting the movement of the remaining eggs on the grade track 35, until the bracket member 41 has been restored to normal position by the spring 42, upon the removal of the operator's hand from said bracket. The eggs having thus been dumped into the carton, the later is moved so that the unfilled section thereof is in alinement with the above described dumping mechanism and the process is repeated when six more eggs have accumulated upon the grade track 35. When the carton has been filled it is removed, and an empty one substituted therefor.

In the event of an egg being heavier than that of the smallest grade of eggs, it tips the weighing devices as successively encountered until it reaches that device adjusted to select eggs of that particular weight or grade. If the egg is heavy enough to actuate all of the scales it eventually comes in contact with the stop 51 on grade track 38 which is designed to collect all the heavy eggs.

If it is desired to pack the eggs in a crate filler instead of a carton, the filler is supported upon one of the special bases 53, which is filled, six eggs at a time, by properly alining a given section thereof with the dumping mechanism, dumping the eggs into the section of the filler and then moving it to another position, the alinement being effected by moving the base 53 until the studs 55 engage with the next succeeding apertures 56.

The automatic control for stopping the feeding of the eggs becomes operative whenever any of the grade track are filled to capacity. The conveyor 5 may continue in operation but no more eggs will be deposited in the pockets thereof until the congestion of eggs on a given track has been relieved, at which time automatic feeding of eggs will be resumed. This permits the operator to devote his entire time and attention to loading eggs on the feed track, and packing the sorted eggs.

Modifications will suggest themselves to those skilled in the art, but all such modifications as come within the scope of the appended claims are to be regarded as contemplated by the present invention.

What is claimed is:

1. In an egg grading and packing machine means for intermittingly feeding eggs, a continuously moving conveyor cooperatively mounted with respect to said feeding means, said conveyor having egg receiving-pockets, means for synchronizing the movement of said pockets with the release of an egg from said feeding means, and a tiltable member adapted to exert a force on the egg as released which has the effect of straightening and centralizing it in the pocket.

2. In an egg grading and packing machine, means for intermittingly feeding eggs, a continuously moving conveyor cooperatively mounted with respect to said feeding means, said conveyor having egg receiving pockets, grade tracks having associated therewith, weighing devices severally adjusted and in the path of said conveyor to intercept eggs of predetermined weights, and a link mechanism common to said feeding means and grade tracks, said link mechanism rendering the feeding means ineffective without stopping the conveyor, whereby the feeding of eggs may be arrested whenever any of the grade tracks have been filled to a capacity designed to actuate said link mechanism, said link mechanism being independently operable with respect to said conveyor.

3. In an egg grading and packing machine, means for intermittingly feeding eggs, a continuously moving conveyor cooperatively mounted with respect to said feeding means, said conveyor having egg receiving pockets, means for synchronizing the movement of said pockets with the release of an egg from said feeding means, a mechanism for grading said eggs according to weight, said mechanism comprising a plurality of scales in operative relation to said conveyor and severally adjusted to function in predetermined weights, grade tracks associated with said scales for supporting eggs in accordance with their respective grade, and control means common to said feeding means and grade tracks for automatically rendering ineffective said feeding means, said control means being designed to prevent automatically the feeding of further eggs to the conveyor without stopping the same.

4. In an egg grading and packing machine having egg feeding means and a continuously moving conveyor co-operatively mounted with respect to the feeding means, said conveyor having egg receiving pockets, means for synchronizing the movement of said pockets with the release of an egg from the feeding means, grade tracks having associated therewith weighing devices severally adjusted and in the path of said conveyor to intercept eggs of predetermined weights, and a link mechanism for automatically arresting the release of eggs from said feeding means to prevent an accumulation of more than a predetermined number of eggs upon any grade track and choking of the machine, said link mechanism rendering said feeding means ineffective without stopping the conveyor.

GEORGE A. SWARTZ.